US011732691B2

(12) United States Patent
Sloth

(10) Patent No.: US 11,732,691 B2
(45) Date of Patent: Aug. 22, 2023

(54) WIND TURBINE NOISE MASKING

(71) Applicant: Vestas Wind Systems A/S, Aarhus N. (DK)

(72) Inventor: Erik Sloth, Aarhus N. (DK)

(73) Assignee: Vestas Wind Systems A/S, Aarhus N (DK)

( * ) Notice: Subject to any disclaimer, the term of this patent is extended or adjusted under 35 U.S.C. 154(b) by 159 days.

(21) Appl. No.: 17/292,820

(22) PCT Filed: Nov. 13, 2019

(86) PCT No.: PCT/DK2019/050345
§ 371 (c)(1),
(2) Date: May 11, 2021

(87) PCT Pub. No.: WO2020/098892
PCT Pub. Date: May 22, 2020

(65) Prior Publication Data
US 2022/0025859 A1 Jan. 27, 2022

(30) Foreign Application Priority Data

Nov. 16, 2018 (DK) .......................... PA 2018 70752

(51) Int. Cl.
F03D 7/02 (2006.01)
G10K 11/178 (2006.01)
(52) U.S. Cl.
CPC ...... F03D 7/0296 (2013.01); G10K 11/17873 (2018.01); F05B 2260/962 (2013.01);
(Continued)

(58) Field of Classification Search
CPC ............ F03D 7/0296; G10K 11/17873; G10K 2210/121; F05B 2260/962; F05B 2270/32; F05B 2270/327; F05B 2270/335
(Continued)

(56) References Cited

U.S. PATENT DOCUMENTS 8,287,228 B2 10/2012 Kinzie et al.
2009/0149999 A1 6/2009 Schramm et al.
(Continued)

FOREIGN PATENT DOCUMENTS

DE 102015008812 A1 1/2017
DK 201570855 A1 1/2017
WO 2018113871 A1 6/2018

OTHER PUBLICATIONS

Danish Patent and Trademark Office, Search and Examination Report in PA 2018 70752, dated May 29, 2019.
(Continued)

Primary Examiner — Vivian C Chin
Assistant Examiner — Douglas J Suthers
(74) Attorney, Agent, or Firm — Wood Herron & Evans LLP

(57) ABSTRACT

A method of masking wind turbine noise from a wind turbine. Masking noise is generated to produce resultant noise with a modulation depth which is less than a modulation depth of the wind turbine noise and an average level which is greater than an average level of the wind turbine noise. The masking noise is either un-modulated masking noise with a substantially constant level, or amplitude-modulated masking noise which is phase-shifted relative to the wind turbine noise and has a modulation depth which is less than the modulation depth of the wind turbine noise.

17 Claims, 3 Drawing Sheets

(52) U.S. Cl.
CPC ..... *F05B 2270/32* (2013.01); *F05B 2270/327* (2013.01); *F05B 2270/335* (2013.01); *G10K 2210/121* (2013.01)

(58) Field of Classification Search
USPC ............................................... 381/71.1, 73.1
See application file for complete search history.

(56) References Cited

U.S. PATENT DOCUMENTS

| | | |
|---|---|---|
| 2010/0272285 A1 | 10/2010 | Loud |
| 2012/0027591 A1* | 2/2012 | Kinzie ................. F03D 7/0296 416/31 |
| 2012/0045071 A1 | 2/2012 | Aarts et al. |
| 2013/0164135 A1 | 6/2013 | Himmelmann |
| 2019/0271295 A1* | 9/2019 | Gupta .................. F03D 7/0276 |

OTHER PUBLICATIONS

European Patent Office, International Search Report and Written Opinion in PCT Application No. PCT/DK2019/050345, dated Feb. 21, 2020.
Science Daily, Anti-noise Silences Wind Turbines, Aug. 13, 2008 (Aug. 13, 2008), pp. 1-2, XP055664018, Retrieved from the Internet: URL:https://www.sciencedaily.com/releases/2008/08/080811095500.htm [retrieved on Jan. 31, 2020].
A. Illgen et al., Active vibration absorber for gear box noise reduction in wind turbines, Adaptronic Conference, Jan. 1, 2007 (Jan. 1, 2007), p. 1.
European Patent Office, Examination Report issued in corresponding EP Application No. 19805129.4, dated Mar. 7, 2023.

* cited by examiner

WIND TURBINE NOISE MASKING

FIELD OF THE INVENTION

The present invention relates to a method of masking wind turbine noise, and an associated wind turbine system.

BACKGROUND OF THE INVENTION

A method for controlling the amplitude modulation of noise generated by a wind turbine is disclosed in U.S. Pat. No. 8,287,228. The method comprises: determining a sound characteristic of a turbine sound wave generated by a wind turbine; and generating an additive sound wave based on the sound characteristic such that a resultant sound wave is produced having both a peak-to-peak amplitude that is smaller than a peak-to-peak amplitude of the turbine sound wave and an average sound pressure level that is greater than an average sound pressure level of the turbine sound wave. The additive sound wave has an average sound pressure level that is less than the average sound pressure level of the turbine sound wave.

A problem with the method of U.S. Pat. No. 8,287,228 is that if the phase difference between the turbine sound wave and the additive sound wave is not close to 180 degrees, then constructive interference may occur which causes the peak-to-peak amplitude of the resultant sound wave to be too high. This may happen due to an error in determining the phase of the turbine sound wave, for instance due to interference from another sound source. Also the phase difference between the turbine sound wave and the additive sound wave may vary from place to place, being 180° in some places but not in others.

SUMMARY OF THE INVENTION

A first aspect of the invention provides a method of masking wind turbine noise from a wind turbine, the method comprising: generating masking noise to produce resultant noise with a modulation depth which is less than a modulation depth of the wind turbine noise and an average level which is greater than an average level of the wind turbine noise. The masking noise is either un-modulated masking noise with a substantially constant level, or amplitude-modulated masking noise which is phase-shifted relative to the wind turbine noise and has a modulation depth which is less than the modulation depth of the wind turbine noise.

A second aspect of the invention provides a wind turbine system comprising: a wind turbine configured to generate wind turbine noise; and a noise generator configured to generate masking noise to produce resultant noise with a modulation depth which is lower than a modulation depth of the wind turbine noise and an average level which is greater than an average level of the wind turbine noise. The noise generator is configured to generate the masking noise as either un-modulated masking noise with a substantially constant level, or amplitude-modulated masking noise which is phase-shifted relative to the wind turbine noise and has a modulation depth which is less than the modulation depth of the wind turbine noise.

The invention recognizes that generating masking noise with a modulation depth which is either zero or relatively low (less than the modulation depth of the wind turbine noise) makes it less likely to cause constructive interference.

The modulation depths and levels of the various noise signals described herein may be in dB(A) or an equivalent unit of sound pressure level. That is, the modulation depth of the resultant noise may be less than the modulation depth of the wind turbine noise in dB(A) or an equivalent unit of sound pressure level. Similarly the average level of the resultant noise may be greater than an average level of the wind turbine noise in dB(A) or an equivalent unit of sound pressure level. The masking noise may either be un-modulated masking noise with a substantially constant level in dB(A) or an equivalent unit of sound pressure level. The amplitude-modulated masking noise may have a modulation depth which is less than the modulation depth of the wind turbine noise in dB(A) or an equivalent unit of sound pressure level.

Optionally the masking noise is un-modulated masking noise with a substantially constant level. This is advantageous because it does not require a measurement of the phase of the wind turbine noise, and the risk of constructive interference is minimised or avoided entirely.

Alternatively the masking noise may be amplitude-modulated masking noise which is phase-shifted relative to the wind turbine noise and has a modulation depth which is less than the modulation depth of the wind turbine noise. The advantage of this arrangement is that a given reduction in modulation depth may be achieved with a lower increase in average level, compared with un-modulated masking noise.

The un-modulated masking noise may not have a substantially constant level at all times, but rather may have a level which varies to adapt to changes in wind speed. For instance the un-modulated masking noise may have a substantially constant level during a time of constant wind speed, but its level may vary up or down at other times to adapt to changes in wind speed.

Optionally the wind turbine noise is amplitude-modulated over a series of two or more modulation cycles, and the masking noise is un-modulated masking noise with a substantially constant level over the series of two or more modulation cycles.

Optionally the wind turbine noise is amplitude-modulated over a series of peaks and troughs, and an average level of the masking noise is greater than the troughs of the wind turbine noise.

Optionally an average level of the masking noise is greater than or equal to the average level of the wind turbine noise.

Optionally the method further comprises measuring a parameter which is directly or indirectly indicative of the modulation depth of the wind turbine noise; and controlling an average level of the masking noise in accordance with the parameter.

Optionally the average level of the masking noise is controlled in accordance with the parameter so that it is greater than or equal to the average level of the wind turbine noise.

The parameter may be directly indicative of the modulation depth of the wind turbine noise—for instance it may be obtained from a noise meter which directly measures the wind turbine noise. Alternatively the parameter may be indirectly indicative of the modulation depth of the wind turbine noise—for instance it may be a wind speed, or a wind turbine operating parameter such as power or rotor speed. In this case the modulation depth of the wind turbine noise may be estimated based on the wind speed or wind turbine operating parameter—for instance using a look-up-table.

Optionally the resultant noise has a modulation depth less than or equal to 3 dB(A).

Optionally the resultant noise has a modulation depth greater than 2 dB(A).

Optionally the average level of the resultant noise is greater than the average level of the wind turbine noise by at least 2 dB(A) or 3 dB(A).

Optionally the masking noise is generated by a loudspeaker.

Optionally the resultant noise has a modulation depth at a receptor which is less than a modulation depth at the receptor of the wind turbine noise and an average level at the receptor which is greater than an average level at the receptor of the wind turbine noise.

Optionally the masking noise is either un-modulated masking noise with a substantially constant level, or amplitude-modulated masking noise which is phase-shifted at the receptor relative to the wind turbine noise and has a modulation depth at the receptor which is less than the modulation depth at the receptor of the wind turbine noise.

Optionally the masking noise is generated by a sound-generating device such as a loudspeaker, and the masking noise is un-modulated masking noise with a substantially constant level at the sound generating device. In this case the level of the un-modulated masking noise at the receptor may vary slightly due to meteorological transmission variations and reflections from objects around the receptor, but any such variation will tend to also affect the wind turbine noise so the masking effect is not influenced greatly.

A further aspect of the invention provides a method of masking wind turbine noise from a wind turbine, the method comprising: generating masking noise to produce resultant noise with a modulation depth which is lower than a modulation depth of the wind turbine noise and an average level which is greater than an average level of the wind turbine noise, wherein an average level of the masking noise is greater than the average level of the wind turbine noise.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
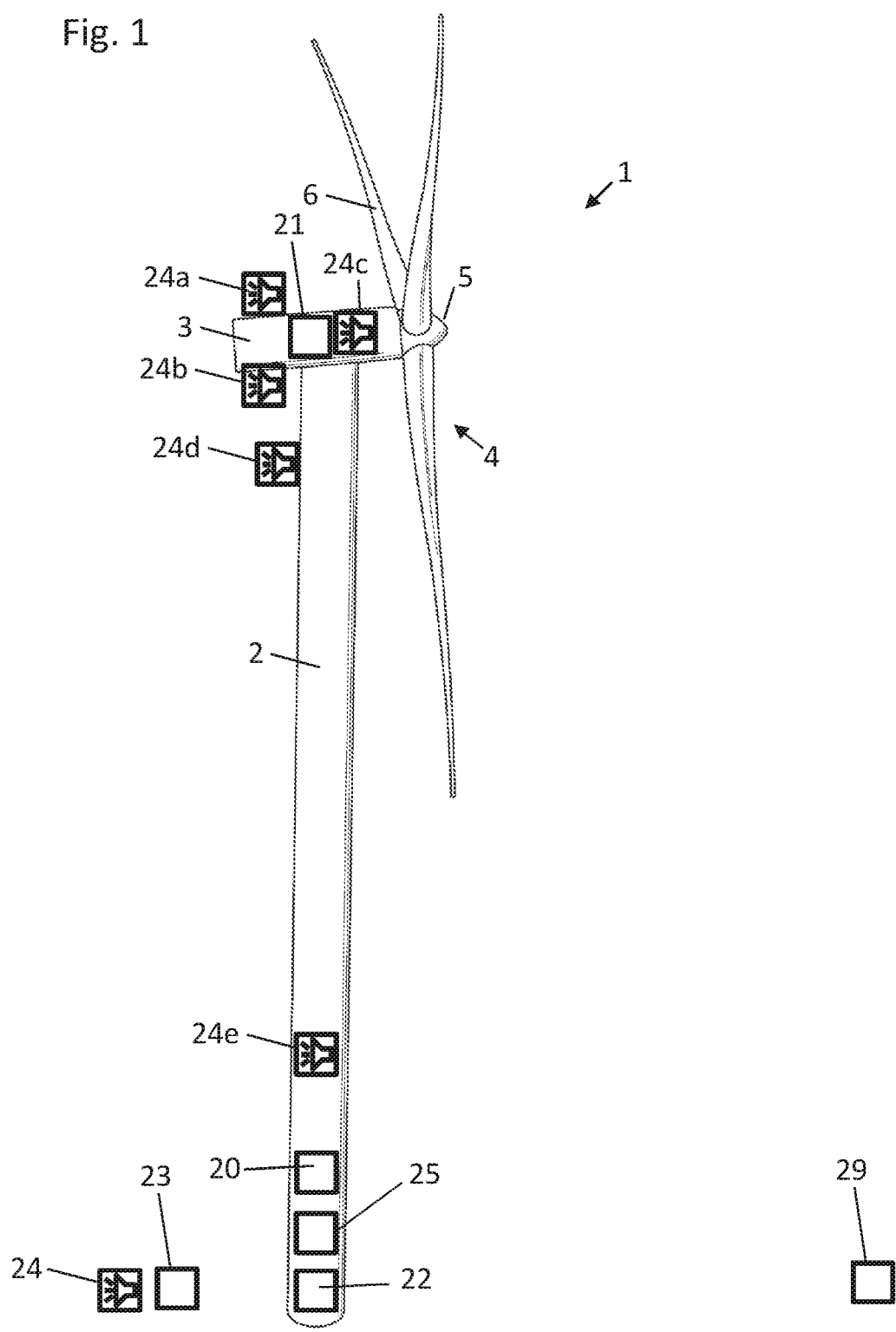
FIG. 1 shows a wind turbine system.

FIG. 1 shows a wind turbine system including a horizontal axis wind turbine 1. The wind turbine 1 comprises a tower 2 supporting a nacelle 3 to which a rotor 4 is mounted. The rotor 4 comprises a plurality of wind turbine blades 6 that extend radially from a central hub 5. In this example, the rotor comprises three blades 6.

Figure 2:
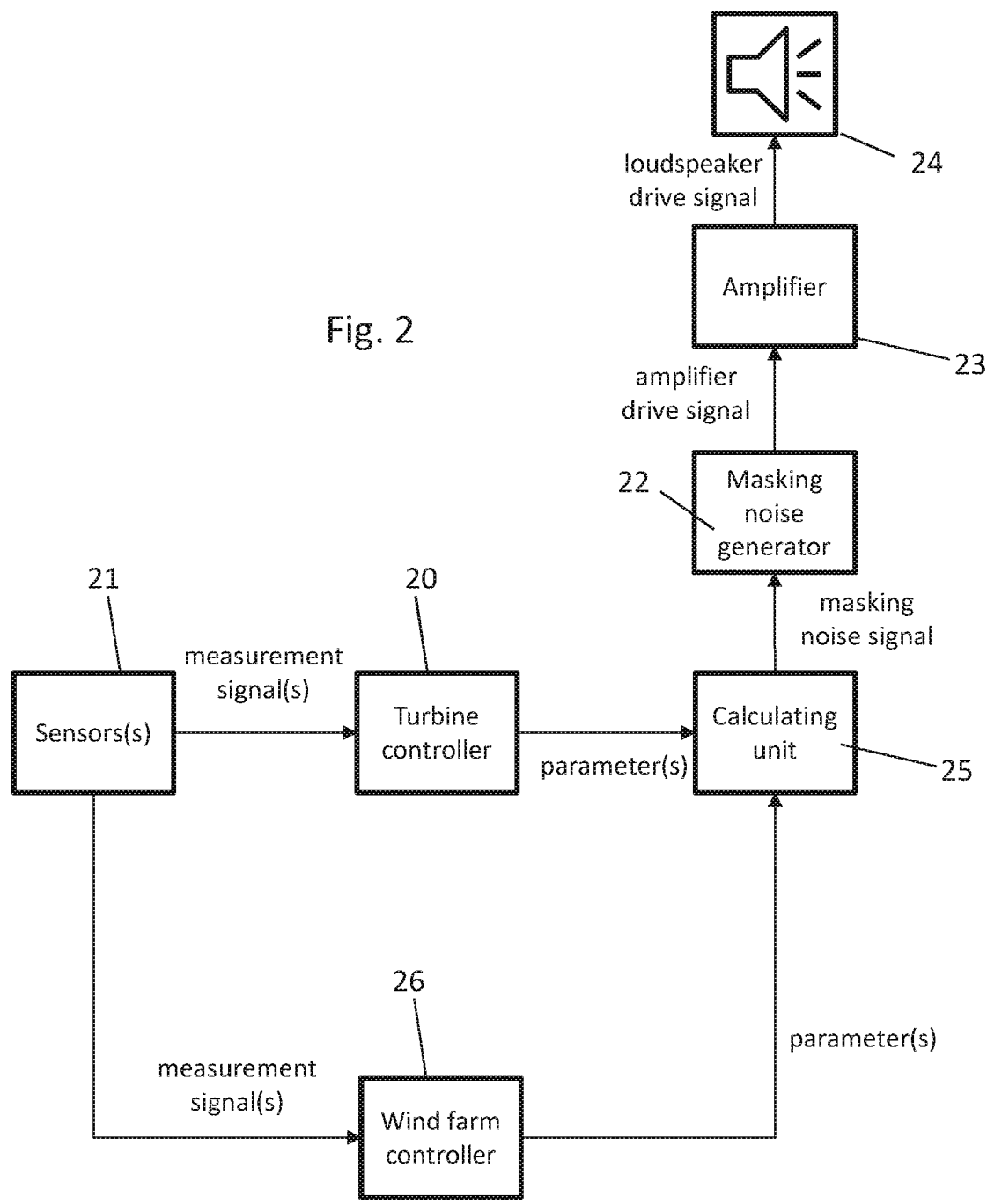
FIG. 2 is a block diagram showing apparatus for masking wind turbine noise from the wind turbine.

FIG. 2 shows apparatus for masking wind turbine noise from the wind turbine 1. Some of the elements of FIG. 2 are mounted on or near the wind turbine 1, and shown in FIG. 1. A turbine controller 20 receives one or more measurement signals from sensor(s) 21, and calculates one or more associated parameters which it sends to a calculating unit 25. The sensor(s) 21 may include a wind sensor mounted on the nacelle 3; a power sensor measuring a power generated by the wind turbine, and/or a rotor speed sensor measuring a speed of the rotor 4. The associated parameters sent to the calculating unit 25 may be a wind speed (for instance in m/s); or a wind turbine operating parameter such as power (for instance in W) or rotor speed (for instance in revolutions per minute or radians per second).

The turbine controller 20 passes the parameter(s) on to a calculating unit 25 that determines a suitable masking noise signal that is sent to a masking noise generator 22. The masking noise generator 22 generates an amplifier drive signal based on the masking noise signal which it inputs into an amplifier 23. The amplifier 23 drives a loudspeaker 24 with a loudspeaker drive signal based on the masking noise signal.

The turbine controller 20, calculating unit 25 and masking noise generator 22 may be a computer or any other electronic device. The turbine controller 20, calculating unit 25 and masking noise generator 22 may be embodied in different electronic devices or the same electronic device.

The elements 20-25 may be mounted to the wind turbine 1 as shown in FIG. 1, or uniquely associated with it. So for example the turbine controller 20, the calculating unit 25, the masking noise generator 22 and the amplifier 23 may be housed in the nacelle 3, in the tower 2 or adjacent to a base of the tower 2. Exemplary positions for the elements 20-25 are shown in FIG. 1 but others are possible.

The wind turbine 1 may be one of a collection of wind turbines in a wind farm. In this case the wind farm may have a wind farm controller 26 which receives measurement signals from the sensor(s) 21 associated with the wind turbine 1 as well as sensors associated with other wind turbines in the wind farm. In this case the parameter(s) may be input to the calculating unit 25 by the wind farm controller 26 rather than the turbine controller 20.

The loudspeaker 24 may be located in a variety of locations indicated in FIG. 1, including on the ground in an optimized height and distance from the base of the tower—as shown in FIG. 1. Other placement options for the loudspeaker are possible including above or on top of the nacelle as shown at 24a; below or hanging from the nacelle as shown at 24b; inside the nacelle radiating through an opening or potentially as an actuator using the nacelle wall as a noise radiating surface—as shown at 24c; on the tower at any height as shown at 24d; or inside the tower—potentially as an actuator using the tower wall as a noise radiating surface—as shown at 24e.

Preferably the loudspeaker 24 is omnidirectional so that it radiates sound approximately equally over all angles of azimuth.

Figure 3:
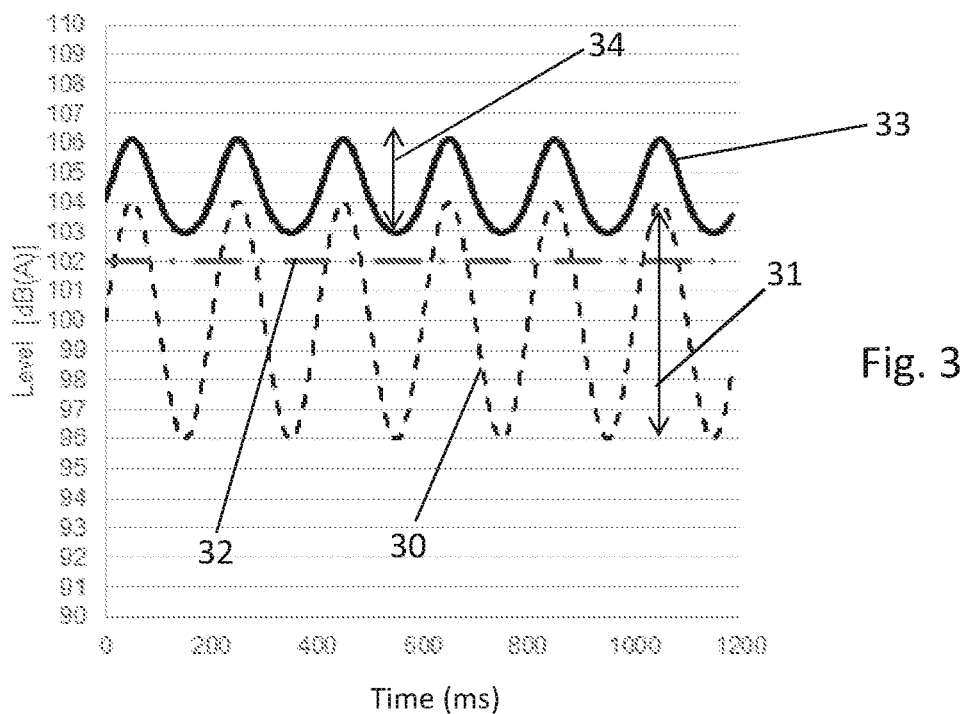
FIG. 3 is a graph showing sound pressure levels of a wind turbine noise, un-modulated masking noise and resultant noise measured at a receptor.

FIG. 3 is a graph showing the sound pressure level in dB(A) measured at a receptor 29 (such as a sound meter) shown in FIG. 1 which is positioned at a suitable location such as the boundary of the wind farm, or the boundary of a neighbouring property.

The wind turbine 1 generates amplitude-modulated wind turbine noise 30 at the receptor 29 which is caused by the rotation of the blades 6 and can be heard as a "swooshing" sound. The average level of the wind turbine noise 30, as well as the frequency and modulation depth of the amplitude modulation of the wind turbine noise 30, will depend on the rate of rotation of the blades 6 as well as aerodynamic factors such as the pitch angle of the blades, the direction of the wind etc. In this example the frequency of the amplitude modulation of the wind turbine noise is about 5 Hz.

Regulations consider not only the average level of the wind turbine noise 30 at the receptor 29, but also its modulation depth in terms of peak-to-peak height. For instance if the modulation depth is greater than 3 dB(A) then a penalty may be incurred. This penalty is expressed as a 6 dB(A) penalty. So the regulation adds the 6 dB(A) penalty to the average level, and if the sum exceeds a threshold then the wind turbine noise is deemed to be above the legal limit.

In order to reduce the modulation depth of the wind turbine noise 30, the loudspeaker 24 may be driven to produce un-modulated masking noise 32 at the receptor 29 as shown in FIG. 3. The wind turbine noise 30 and the masking noise 32 combine additively to produce resultant noise 33 at the receptor 29.

Table 1 below sets out the average sound pressure level and modulation depth at the receptor 29 of each of the noise signals of FIG. 3.

TABLE 1

|  | Average level (dB(A)) | Modulation depth (dB(A)) |
| --- | --- | --- |
| Wind turbine noise | 100 | 8 |
| Un-modulated masking noise | 102 | 0 |
| Resultant noise | 104.5 | 3 |

The resultant noise 33 may have a modulation depth (3 dB(A)) at the receptor 29 as indicated by a peak-to-peak height 34 in FIG. 3 which is less than the modulation depth at the receptor of the wind turbine noise (8 dB(A)) as indicated by peak-to-peak height 31. The resultant noise 33 may also have an average level (104.5 dB(A)) at the receptor 29 which is greater than that of the wind turbine noise (100 dB(A)).

The average level of the un-modulated masking noise 32 is controlled by the calculating unit 25 and the masking noise generator 22 to ensure that the modulation depth 34 at the receptor 29 of the resultant noise 33 is reduced to a desired level—for example 3 dB(A) as shown in FIG. 3. This control may be achieved by the following method.

The sensor(s) 21 provide outputs which are indirectly indicative of the average level and modulation depth of the wind turbine noise 30 at the receptor 29, and can be analysed to infer these properties. So for example the sensor(s) 21 may include a wind sensor mounted on the nacelle 3. Higher wind speed will lead to a wind turbine noise with a higher average level and modulation depth. The relationship between these parameters can be measured by the sensor(s) 21 and the receptor 29 and then stored in a look-up-table, so for a given wind speed the lookup-table outputs an estimated average level and modulation depth of the wind turbine noise 30 at the receptor 29. A similar principal can be used to estimate the average level and modulation depth 31 of the wind turbine noise 30 at the receptor 29 based on the output of a power sensor measuring a power generated by the wind turbine, or a rotor speed sensor measuring the speed of the rotor 4.

The masking noise generator 22 analyses the parameter(s) received from the turbine controller 20, estimates the average level and modulation depth 31 of the wind turbine noise 30 at the receptor 29 based on these parameters, and sets the average level of the masking noise 32 accordingly so that the modulation depth 34 of the resultant noise 33 is reduced to an acceptable level.

The average level (102 dB(A)) of the un-modulated masking noise 32 in the example of FIG. 3 is set to be 2 dB(A) greater than the average level (100 dB(A)) of the wind turbine noise 30. This ensures that the modulation depth 34 of the resultant noise 33 is reduced to 3 dB(A) to avoid a penalty under the regulations.

The resultant noise 33 has an average level (104.5 dB(A)) which is 4.5 dB(A) greater than that of the wind turbine noise 30 (100 dB(A)), but this is less than the 6 dB(A) penalty that would have been incurred if the modulation depth had not been reduced from 8 dB(A) to 3 dB(A).

Alternatively the average level of the un-modulated masking noise 32 may be set to be equal to or less than the average level of the wind turbine noise 30 if a higher modulation depth 34 of the resultant noise 33 is acceptable.

If the average level of the un-modulated masking noise 32 is reduced compared with FIG. 3, then typically it remains greater than the level at the troughs of the wind turbine noise 30, in other words greater than 96 dB(A) in this example.

The average level of the un-modulated masking noise 32 may also be increased compared with FIG. 3. This will increase the average level of the resultant noise but will also decrease its modulation depth below 3 dB(A).

The masking noise signal output by the calculating unit 25 has a substantially constant level in dB(A), as does the loudspeaker drive signal input to the loudspeaker 24 and the sound pressure level in dB(A) of the masking noise at the loudspeaker 24. Accordingly the level of the un-modulated masking noise 32 at the receptor 29 may be substantially constant as shown in FIG. 3, although the level of the un-modulated masking noise 32 measured at the receptor 29 may vary slightly (for instance by 1 to 2 dB(A)) due to measurement errors, reflections or other artefacts. Variations of the order of 1 dB(A) may be caused by meteorological transmission variations, and variations of the order of 2 dB(A) may be caused by reflections from objects around the receptor 29. Such reflections will most likely also affect the amplitude-modulated wind turbine noise 30 to the same degree, so the relative difference between the wind turbine noise 30 at the receptor and the masking noise 32 at the receptor will not change and the masking effect is not influenced greatly. In any event, any small variations in the level of the un-modulated masking noise 32 measured at the receptor 29 will be less than the modulation depth 31 of the wind turbine noise 30 at the receptor.

The wind turbine noise 30 is amplitude-modulated over a series of modulation cycles, five full modulation cycles being shown in FIG. 3. The un-modulated masking noise 32 has a substantially constant level of 102 dB(A) over the series of modulation cycles shown in FIG. 3, but its level may increase or decrease slowly at a later time to adapt to changes in wind speed.

Variations in the wind will cause associated variations in the level of the un-modulated masking noise 32 at the receptor 29. Such variations will occur over a time scale of minutes, whereas on the shorter time scale of the amplitude-modulation the level of the un-modulated masking noise 32 at the receptor 29 can be considered quasi-static. In other words, there may only be minimal variations (no greater than 0.1 dB(A)) in the level of the un-modulated masking noise 32 at the receptor 29 over the time scale of, say, two modulation cycles of the amplitude-modulated wind turbine noise (about 0.4 seconds in the case of FIG. 3).

Figure 4:
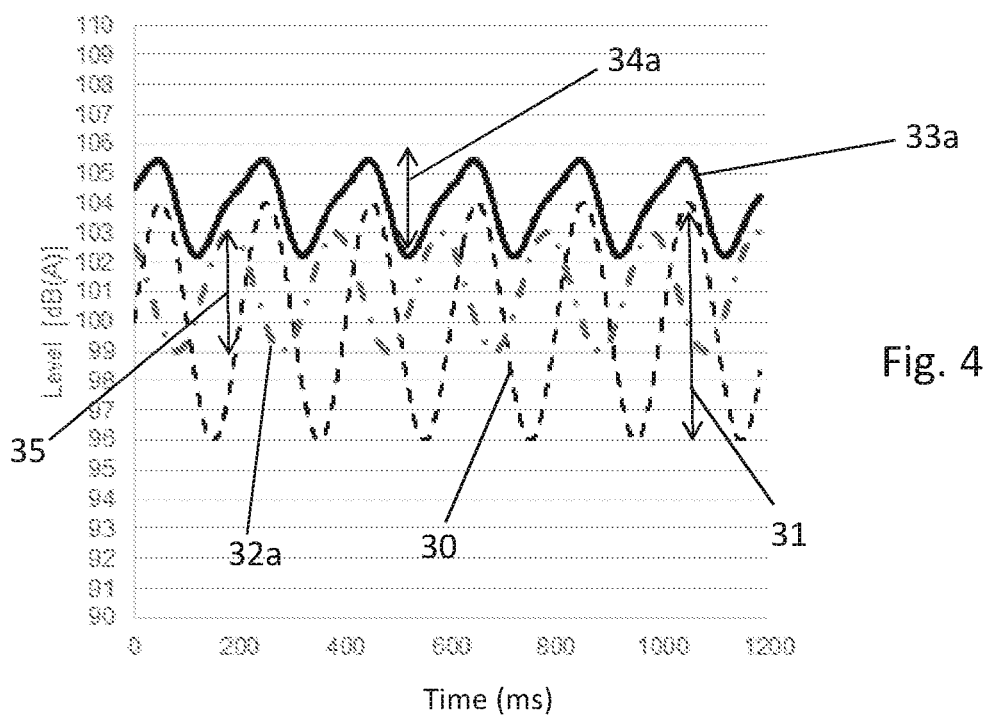
FIG. 4 is a graph showing sound pressure levels of a wind turbine noise, amplitude-modulated masking noise and resultant noise measured at a receptor.

FIG. 4 is a graph showing the sound pressure level in dB(A) measured at the receptor 29 in an alternative embodiment. In this case, the masking noise is amplitude-modulated masking noise 32a which is phase-shifted relative to the wind turbine noise 30 and has a modulation depth as indicated by peak-to-peak height 35.

Table 2 below sets out the average sound pressure level and modulation depth at the receptor 29 of each of the noise signals of FIG. 4.

TABLE 2

|  | Average level (dB(A)) | Modulation depth (dB(A)) |
| --- | --- | --- |
| Wind turbine noise | 100 | 8 |
| Modulated masking noise | 101 | 4 |
| Resultant noise | 103.8 | 3.2 |

The resultant noise 33a has a modulation depth (3.2 dB(A)) as indicated by a peak-to-peak height 34a in FIG. 4 which is less than the modulation depth of the wind turbine noise 30 (8 dB(A)) as indicated by peak-to-peak height 31. The resultant noise 33a also has an average level (103.8 dB(A)) which is greater than that of the wind turbine noise (100 dB(A)).

The modulated masking noise 32a has a modulation depth (4 dB(A)) as indicated by peak-to-peak height 35 in FIG. 4 which is relatively low, less than that of the wind turbine noise 30 (8 dB(A)). The relatively low modulation depth of the modulated masking noise 32a ensures that any constructive interference is kept relatively low. Also, the relatively low modulation depth 35 of the modulated masking noise 32a makes it insensitive to inaccuracy in the phase-shift. Ideally the modulated masking noise 32a is phase-shifted by 180° relative to the wind turbine noise 30, in other words the noise signals are in precise anti-phase. FIG. 4 shows a modulated masking noise 32a which is not precisely in anti-phase phase with the wind turbine noise 30 (rather it is phase-shifted by 125°) but nevertheless it reduces the modulation depth 34a of the resultant noise 33a to an acceptable level.

The advantage of using the amplitude-modulated masking noise 32a of FIG. 4 is that a given reduction in modulation depth can be achieved with a lower increase in average level, compared with the un-modulated masking noise shown in FIG. 3.

The masking noise 32 or 32a may be broadband white noise, but more preferably it only spans a limited frequency range which matches the frequency range of the wind turbine noise 30. For instance the masking noise 32 or 32a may be band limited to a frequency range of 100 Hz to 400 Hz, or 200 Hz to 500 Hz. This minimises the amount of sound energy that must be produced.

Although the invention has been described above with reference to one or more preferred embodiments, features of one embodiment may be applicable to other embodiments and it will be appreciated that various changes or modifications may be made without departing from the scope of the invention as defined in the appended claims.

The invention claimed is:

1. A method of masking wind turbine noise from a wind turbine, the method comprising:
   generating masking noise to produce resultant noise with a modulation depth which is less than a modulation depth of the wind turbine noise and an average level which is greater than an average level of the wind turbine noise, wherein the masking noise is either un-modulated masking noise with a substantially constant level, or amplitude-modulated masking noise which is phase-shifted relative to the wind turbine noise and has a modulation depth which is less than the modulation depth of the wind turbine noise;
   measuring a parameter which is directly or indirectly indicative of the modulation depth of the wind turbine noise; and
   controlling an average level of the masking noise in accordance with the parameter.

2. The method according to claim 1 wherein the wind turbine noise is amplitude-modulated over a series of two or more modulation cycles, and the masking noise is un-modulated masking noise with a substantially constant level over the series of two or more modulation cycles.

3. The method according to claim 1 wherein the wind turbine noise is amplitude-modulated over a series of peaks and troughs, and an average level of the masking noise is greater than the troughs of the wind turbine noise.

4. The method according to claim 1 wherein an average level of the masking noise is greater than or equal to the average level of the wind turbine noise.

5. The method according to claim 1 wherein an average level of the masking noise is greater than the average level of the wind turbine noise.

6. The method according to claim 1 wherein the average level of the masking noise is controlled so that it is greater than or equal to the average level of the wind turbine noise.

7. The method according to claim 1 wherein the parameter is a wind speed parameter or a wind turbine operating parameter.

8. The method according to claim 1 wherein the parameter is a rotor speed parameter indicating a speed of a rotor of the wind turbine, or a power parameter indicating a power generated by the wind turbine.

9. The method according to claim 1 wherein the resultant noise has a modulation depth less than or equal to 3 dBA.

10. The method according to claim 1 wherein the resultant noise has a modulation depth greater than 2 dBA.

11. The method according to claim 1 wherein the average level of the resultant noise is greater than the average level of the wind turbine noise by at least 2 dBA.

12. The method according to claim 1 wherein the masking noise is generated by a loudspeaker.

13. The method according to claim 1 wherein the resultant noise has a modulation depth at a receptor which is less than a modulation depth at the receptor of the wind turbine noise and an average level at the receptor which is greater than an average level at the receptor of the wind turbine noise.

14. The method according to claim 1 wherein the resultant noise has a modulation depth at a receptor which is less than a modulation depth at the receptor of the wind turbine noise and an average level at the receptor which is greater than an average level at the receptor of the wind turbine noise, wherein the masking noise is either un-modulated masking noise with a substantially constant level, or amplitude-modulated masking noise which is phase-shifted at the receptor relative to the wind turbine noise and has a modulation depth at the receptor which is less than the modulation depth at the receptor of the wind turbine noise.

15. The method according to claim 1, wherein the masking noise is un-modulated masking noise with a substantially constant level.

16. The method according to claim 1, wherein the masking noise is generated by a sound-generating device, and the masking noise is un-modulated masking noise with a substantially constant level at the sound generating device.

17. A wind turbine system comprising:
   a wind turbine configured to generate wind turbine noise;
   a noise generator configured to generate masking noise to produce resultant noise with a modulation depth which is lower than a modulation depth of the wind turbine noise and an average level which is greater than an average level of the wind turbine noise, wherein the noise generator is configured to generate the masking noise as either un-modulated masking noise with a substantially constant level, or amplitude-modulated masking noise which is phase-shifted relative to the wind turbine noise and has a modulation depth which is less than the modulation depth of the wind turbine noise;

one or more sensors for measuring a parameter which is directly or indirectly indicative of the modulation depth of the wind turbine noise; and a controller operatively coupled to the noise generator and the one or more sensors and including one or more processors and a memory storing program code that, when executed by the one or more processors, causes the controller to perform the method of claim 1.

* * * * *